United States Patent [19]
Siniakevith et al.

[11] Patent Number: 5,651,321
[45] Date of Patent: Jul. 29, 1997

[54] METHOD OF AND MEANS FOR PRODUCING COMBUSTIBLE GASES FROM LOW GRADE FUEL

[75] Inventors: Boris Siniakevith, Lwow, Ukraine; Mark Khaskin, Ashdod, Israel; Daniel Goldman, Raanana, Israel; Benjamin Doron, Jerusalem, Israel; Lucien Y. Bronicki, Yavne, Israel; Eli Yaffe, Savyon, Israel

[73] Assignee: Ormat Industries Ltd., Yavne, Israel

[21] Appl. No.: 582,597

[22] Filed: Jan. 3, 1996

Related U.S. Application Data

[63] Continuation of Ser. No. 365,327, Dec. 28, 1994, abandoned, which is a continuation of Ser. No. 78,502, Jun. 18, 1993, abandoned.

[30] Foreign Application Priority Data

Jun. 28, 1992 [IL] Israel ........................................... 102343
Jun. 9, 1993 [IL] Israel ........................................... 105969

[51] Int. Cl.⁶ ...................................................... F23B 7/00
[52] U.S. Cl. ................ 110/341; 110/101 R; 110/101 A; 110/110; 110/229; 110/233; 198/657; 198/669; 198/671; 414/158; 414/175
[58] Field of Search ............................. 110/110, 101 R, 110/101 A, 101 CF, 229, 233, 341, 347; 198/657, 671, 669; 414/158, 175, 190, 197, 326

[56] References Cited

U.S. PATENT DOCUMENTS

| | | | |
|---|---|---|---|
| 2,115,464 | 4/1938 | Kirby ................................ | 414/175 X |
| 2,928,718 | 3/1960 | Berglund . | |
| 4,086,962 | 5/1978 | Cha . | |
| 4,110,064 | 8/1978 | Vorona et al. . | |
| 4,165,717 | 8/1979 | Reh et al. . | |
| 4,181,705 | 1/1980 | Gumerman . | |
| 4,185,080 | 1/1980 | Rechmeier . | |
| 4,211,606 | 7/1980 | Ponomarev et al. . | |
| 4,373,454 | 2/1983 | Pitrolo et al. . | |
| 4,388,877 | 6/1983 | Molayem . | |
| 4,544,478 | 10/1985 | Kellev . | |
| 4,601,657 | 7/1986 | Henin et al. . | |
| 4,648,965 | 3/1987 | McMath . | |
| 4,700,639 | 10/1987 | Esterson et al. . | |
| 4,961,756 | 10/1990 | Rich . | |
| 4,981,667 | 1/1991 | Berg et al. . | |
| 5,078,261 | 1/1992 | Miller et al. ........................ | 198/671 X |
| 5,090,338 | 2/1992 | Harada et al. ...................... | 110/110 X |

FOREIGN PATENT DOCUMENTS

| | | | |
|---|---|---|---|
| 0184847 | 6/1986 | European Pat. Off. . | |
| 0485354 | 10/1928 | Germany ............................ | 198/657 |
| 68149 | 3/1983 | Israel . | |
| WO91004310 | 4/1991 | WIPO . | |
| WO84003516 | 9/1994 | WIPO . | |

OTHER PUBLICATIONS

"Combustion of Solid Fuel in Air-fluidized Bed" by V.A. Borduluya et al., Nauka i Tekhnia, 1980, pp. 171-172 and Eng. translation.

"Protection of Water and Air Basins from Effluents of Heat Electric Stations" by L.A. Rikhter et al., Energoizdat, 1981, pp. 62-64 and English translation.

(List continued on next page.)

*Primary Examiner*—Henry A. Bennett
*Assistant Examiner*—Susanne C. Tinker
*Attorney, Agent, or Firm*—Donald M. Sandler

[57] ABSTRACT

In accordance with the present invention, a method for supplying solid material such as hot carbonaceous material from a pyrolyzer or reactor to a furnace, is provided comprising providing a screw conveyor for receiving the solid carbonaceous material from the pyrolyzer or reactor preferably from above the conveyor and transporting it along its length to a vaned rotor preferably positioned on the axle of the screw conveyor preferably substantially near the end of the screw conveyor for supplying the carbonaceous material to the furnace.

28 Claims, 8 Drawing Sheets

OTHER PUBLICATIONS

"Institute of Energy: 51st Melchett Lecture, Clean Combustion of Coal, Research and Applications—An Overview of Recent Development in the USA", J.M. Beer, Journal of the Institute of Energy, 3, Mar., 1986.

"The Application of Direct Limestone Injection to UK Power Station", N.A. Burdett et al., J. of the Inst. of Energy, 64, Jun. 1986.

"Simutaneous Reduction of NOx and SO2 in Pulverized Coal Flames by Application of Staged Combustion and Direct Injection of Lime", *Revue General de Themique*, 21, No. 248–249, pp. 649–663, 1982.

"Chemical Abstracts", 96:145902 n.

Esterson, G. et al., *Generation of Energy from Shale of Israel: The Genesis Process*, Final Report No. 8403, The Energy Research Center, The Hebrew University, Sep., 1984.

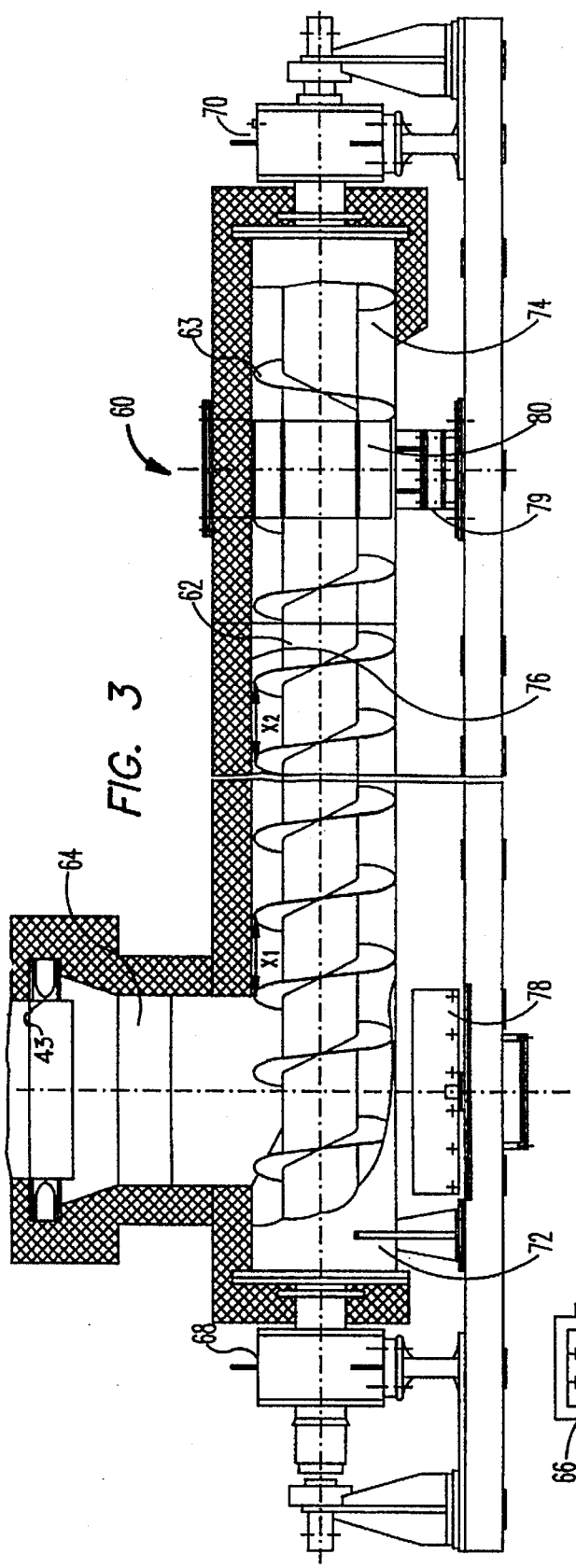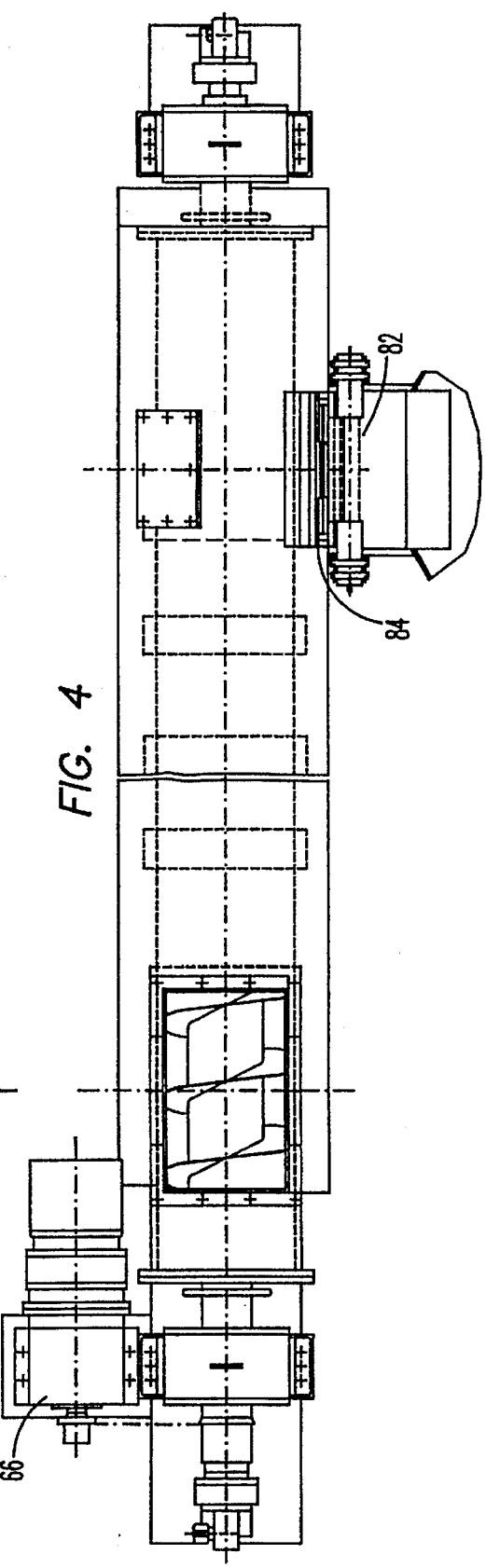
FIG. 3
FIG. 4

METHOD OF AND MEANS FOR PRODUCING COMBUSTIBLE GASES FROM LOW GRADE FUEL

This application is a continuation of application Ser. No. 365,327, filed Dec. 28, 1994 now abandoned. This application is a continuation of application Ser. No. 08/078,502, filed Jun. 18, 1993, now abandoned.

TECHNICAL FIELD

This invention relates to a method of and means for producing combustible gases from solid fuel such as low grade solid fuel for example oil shale and/or the like and more particularly to a method of and means for supplying solid material using a screw conveyor.

BACKGROUND OF THE INVENTION

Oil shale is found throughout the world and would constitute a plentiful and relatively inexpensive fuel if techniques were available for quickly and inexpensively processing the oil shale into combustible gases. One approach to processing oil shale into combustible gases is disclosed in U.S. Pat. No. 4,211,606 (the disclosure of which is hereby incorporated by reference). In this patent, oil shale is heated in a dryer using clean, hot flue gases producing heated shale that is applied to a pyrolyzer or reactor. The heated shale is further heated in the pyrolyzer with hot ash to produce combustible products, and carbonaceous material that is added to a gasifier. Hot gases and steam are applied to the gasifier such that combustible gases are produced. The residue of the gasifier is extracted and applied to what the patent terms an air jet furnace, details of which are disclosed in U.S. Pat. No. 4,110,064 the disclosure of which is also incorporated by reference.

The air jet furnace produces combustion products in the form of hot flue gases whose major constituents are nitrogen, carbon dioxide and particulates which are applied to a separator which separates the combustion products into a stream of hot coarse ash, portion of which is supplied to the pyrolyzer and another portion of which is disposed of, and a stream of hot gas containing fine ash. The stream of hot gas and fine ash is applied to a separator that produces a stream of fine ash that is applied to the gasifier, and a stream of bases containing residual ash. The latter stream is applied to a further separator that produces the clean flue gases that serve to heat the shale in the dryer.

A less complex derivative of the apparatus described above has apparently been used in two plants in the U.S.S.R. in 1990 and 1991. As presently understood, the actual design eliminates the gasifier and the dryer. Oil shale is fed into a pyrolyzer wherein pyrolyzation takes place producing carbonaceous material after a predetermined residence time of the shale in the pyrolyzer. This material is supplied to an air jet furnace wherein combustion takes place producing hot flue gases, and particulates that are applied to a separator which separates the flow into a stream of coarse ash, and a stream of hot flue gases containing fine ash, such as fly ash. The stream containing the hot coarse ash is applied to the pyrolyzer which produces pyrolysis gas at a temperature in excess of 400° C. Such gas contains combustible products, steam and carbon compounds. The stream containing the combustible products from the pyrolyzer is applied, together with the stream of hot flue gases containing fine ash to a burner that is part of a combustion chamber of a boiler that produces steam that may be used for generating electricity.

One of the problems with such systems is the conveyor or feeder which are used for supplying the carbonaceous material from the pyrolyzer to the furnace. Furthermore, such conveyors would also be problematic were they used for supplying carbonaceous material from the pyrolyzer to the gasifier and material from the gasifier to the furnace in systems operating in accordance with U.S. Pat. No. 4,211,606. Firstly, the temperature of the carbonaceous material is reasonably high, approximately 400° C. or more. Such high temperatures cause problems including thermal expansion. Secondly, when screw conveyors are used, they are known to suffer from lateral movement. Thirdly, a constant and steady feed of the hot carbonaceous material has to be ensured in order, among other things to assure that any back pressure from gases flowing in the furnace does not cause combustion or high temperatures in the conveyor. Furthermore, the bearings of the motor which operates the conveyor is prone to wear and tear. In addition, such systems suffer from a reduction in thermal efficiency and available power caused by fouling of the heat transfer in the steam boiler of the power plant due to the entry of fly ash into the boiler and by carbonate decomposition. Also such systems are usually designed to operate on a certain oil shale and cannot be easily converted for use with another oil shale. Additionally, these systems are suited for operation with oil shale having a relatively high calorific value (eg. above 2,000 kcal/kg) and are not actually suitable for use with oil shales having a very low calorific value (eg. 700 kcal/kg).

It is therefore an object of the present invention to provide a new and improved method of and means for producing combustible gases from solid fuel such as low grade solid fuel for example oil shale and/or the like which substantially overcomes or significantly reduces the disadvantages outlined above.

BRIEF DESCRIPTION OF THE INVENTION

In accordance with present invention, a method for supplying solid material such as hot carbonaceous material from a pyrolyzer or reactor to a furnace, is provided comprising providing a screw conveyor for receiving the solid carbonaceous material from the pyrolyzer or reactor preferably from above the conveyor and transporting it along its length to a vaned rotor preferably positioned on the axle of the screw conveyor preferably substantially near the end of the screw conveyor for supplying the carbonaceous material to the furnace.

The rotor has a substantially horizontal, side exit chute positioned substantially near the rotor for transporting the solid carbonaceous material from the vaned rotor to the furnace such that the carbonaceous material is moved substantially tangentially to the axis of rotation of the screw conveyor and thus extracted substantially horizontally and perpendicular to the axis of rotation of the screw conveyor. Preferably, the chute is slightly upwardly inclined to the horizontal such that the carbonaceous material accumulates and produces a plug of material at the exit chute. Furthermore, the chute is preferably positioned at the lower portion of the rotor where usually most of the carbonaceous material is found. Also preferably, the chute is provided with an expansion joint advantageously including a ball joint to give the chute flexibility.

In addition, two bearings are provided, one at each end of the screw conveyor for supporting the axle of the conveyor. Furthermore, the chute is preferably provided with a substantially vertically maneuverable, hinged and preferably length adjustable extension such that when the chute is connected to the furnace, the hinged flap is present in the furnace. Positioning this extension at a certain angle to the horizontal and preferably setting its length also permits carbonaceous material to accumulate at the exit chute producing a plug of material such that the flow of gases present in the furnace into the chute and the screw conveyor is minimized. If preferred, a plate or pair of plates positioned adjacent the rotor and in the upper portion of the conveyor housing can be provided for further minimizing the possibility of gases present in the furnace to enter into and flow along the screw conveyor.

According to the present invention, apparatus is also provided for supplying solid material such as carbonaceous material from a pyrolyzer or reactor to a furnace comprising a screw conveyor for receiving the solid carbonaceous material from the pyrolyzer or reactor preferably from above the conveyor and transporting it along its length to a vaned rotor positioned preferably on the axle of the screw conveyor preferably substantially near the end of the screw conveyor for supplying the carbonaceous material to the furnace. The apparatus also is provided with a substantially horizontal, side exit chute, which is preferably slightly upwardly inclined to the horizontal, and positioned substantially near the rotor for transporting the solid carbonaceous material from the vaned rotor to the furnace such that the carbonaceous material is moved substantially tangentially to the axis of rotation of the screw conveyor and extracted from the screw conveyor substantially horizontally and perpendicular to the axis of rotation of the screw conveyor. Consequently, the carbonaceous material accumulates and produces a plug of material at the exit chute. Furthermore, the chute is preferably positioned at the lower portion of the rotor where usually most of the carbonaceous material is found. Also preferably, the chute is provided with an expansion joint which advantageously comprises a ball joint for providing flexibility to the chute.

In addition, two bearings are provided, one at each end of the screw conveyor, for supporting the axle of the conveyor. Furthermore, the chute is preferably provided with a substantially vertically maneuverable, hinged preferably length adjustable extension such that when the chute is connected to the furnace, the hinged extension is present in the furnace. Thus, by maneuvering the extension and setting it at a certain angle as well as preferably setting its length, the extension also permits carbonaceous material to accumulate at the exit chute to produce a plug of material which minimizes the flow of gases from the furnace, in which a higher pressure usually prevails, into the chute and the screw conveyor. If preferred, a plate or pair of plates positioned adjacent the rotor and in the upper portion of the conveyor housing can be provided for further minimizing the possibility of gases present in the furnace to enter-into and flow along the screw conveyor.

By using a vaned rotor positioned preferably on the axle of the screw conveyor to supply the carbonaceous material to the furnace, a constant and steady feed of the hot carbonaceous material exiting the conveyor is ensured, while the use a chute slightly inclined to the horizontal contributes to assuring the buildup of carbonaceous material at the chute. In such a manner, a plug of material is produced at the exit of the chute. In order to ensure this, the chute is preferably positioned at the lower portion of the rotor where usually most of the carbonaceous material is found. The plug of material produced minimizes the flow into the chute and screw conveyor of gases present in the furnace having a slightly higher pressure above air or gases found in the conveyor. In this regard, the preferably provided vertically maneuverable, hinged length adjustable extension additionally aids in producing the plug of material for minimizing the gas flow into the chute and screw conveyor from the furnace.

In addition, the provision of two bearings each supporting an end of the conveyor substantially reduces the lateral movement of the conveyor and wear and tear on the bearings were only one bearing used.

Preferably, the conveyor and rotor are made of heat resistant material in order to provide reliable operation in the high temperature range.

It is presently envisaged that a conveyor constructed and operated in accordance with present invention can be used for transporting virtually any solid material, particularly when the solid material is hot and/or where its outlet is present in an environment or location containing gases having a pressure higher than gases present in the conveyor. However, in what is presently considered to be the best mode for carrying out the present invention, the conveyor is preferably incorporated in a system for producing combustible gases from solid fuel such as low grade solid fuel for example oil shale and/or the like. In such a system, a pyrolyzer or reactor is used for pyrolyzing portion of the low grade solid fuel to produce combustible gases and carbonaceous material. The screw conveyor, preferably used, receives the hot solid carbonaceous material from the pyrolyzer, preferably from above the conveyor, and transports it along its length to the rotor positioned preferably on the axle of the screw conveyor preferably substantially near its end for supplying the carbonaceous material to the furnace. Means for adding a further portion of the solid fuel to the furnace are provided such that the carbonaceous material and the further portion of solid fuel are combusted in the furnace to produce combustion products that include hot flue gases and ash particulate. A separator separates the combustion products into a number of streams, one of which contains ash and the another of which contains flue gases and fine ash. Ash from the first mentioned stream is directed into said pyrolyzer.

The conveyor can also be used in a system for improving raw phosphates containing organic matter wherein the preferred system is analogous to the system described hereinbefore for producing combustible gases from low grade solid fuel.

BRIEF DESCRIPTION OF THE DRAWINGS

Embodiments of the present invention are described by way of the example with reference to the accompanying drawings wherein:

FIG. 3 is a cross-sectional diagram of an embodiment of the present invention;

FIG. 4 is a plan view of the embodiment of the invention shown in FIG. 3;

DETAILED DESCRIPTION

Figure 1:
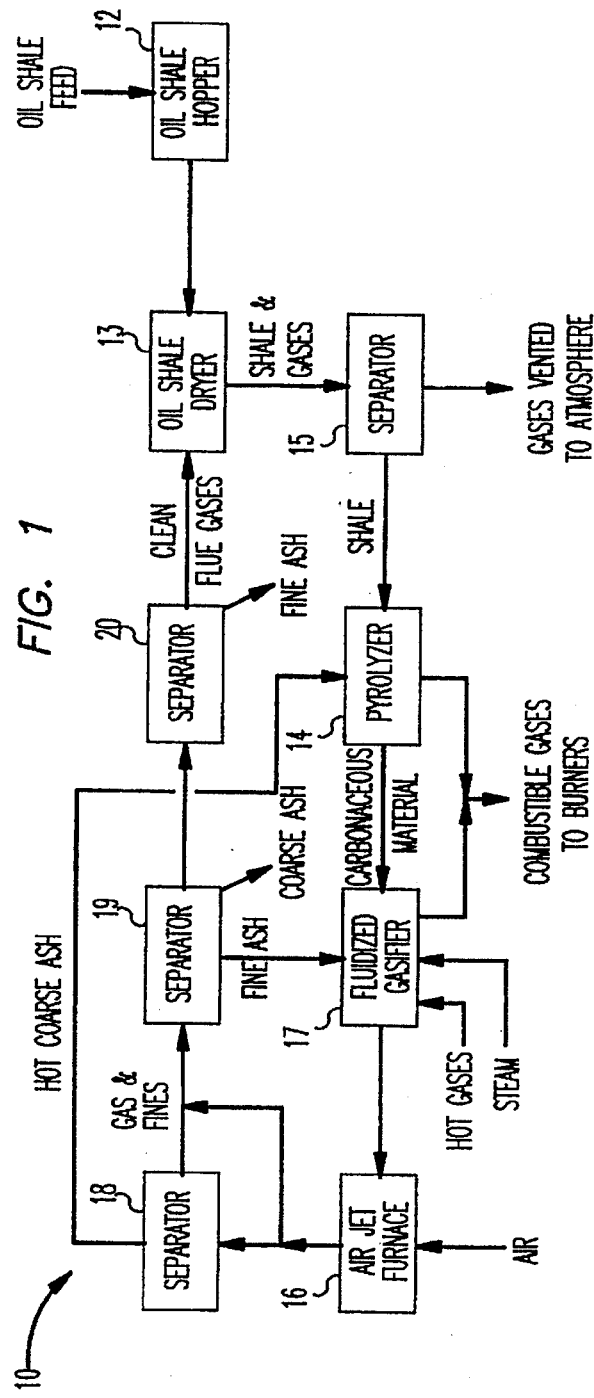
FIG. 1 is a block diagram which represents, in a schematic way, existing power plants for producing combustible gases from low grade solid fuel such as oil shale.

Referring now to FIG. 1, reference numeral 10 designates conventional apparatus for producing combustible products and gases from a low grade solid fuel such as oil shale. Ground oil shale is usually applied to oil shale hopper 12 having a screw conveyor device for supplying shale from hopper 12 to dryer 13 that is supplied with clean flue gas that heats and dries the shale producing steam and other gases. The output of the dryer is applied to separator 15 which separates solids of the oil shale from the gases and applies the solids to pyrolyzer or reactor 14, the gases being vented to the atmosphere. Pyrolysis takes place in pyrolyzer 14 under the influence of hot combustion products in the form of hot coarse ash applied to the pyrolyzer. In response, the pyrolyzer produces pyrolysis gases in the form of steam and combustible gases in excess of 400° C.

The carbonaceous material formed in pyrolyzer 14 is fed by fed means such as screw conveyer 14A to gasifier 17 which also receives hot combustion products in the form of fine ash. The contents of the gasifier are fluidized by the application of hot gases and steam; and the resultant product including carbonaceous material is supplied by fed means such as screw conveyer 16A to air jet furnace 16 wherein combustion of these products including the carbonaceous material takes place in the presence of ambient air supplied to the furnace. The outputs of the furnace are products of combustion comprising flue gases and particulate material which are applied to separator 18. Separator 18 is effective to divide the flow into at least two streams, one of which contains hot coarse ash and another of which contains hot flue gases and hot fine ash.

The first stream containing the hot coarse ash is applied to the pyrolyzer and supplies the heat by which the pyrolysis takes place. The other stream containing the hot fine ash is applied to separator 19 to separate most of the fine ash which is applied to the gasifier, and producing relatively clean gases that are applied to separator 20 which is effective to remove residual ash and produce clean hot gases that are applied to dryer 13. A burner (not shown) receives combustion gases from gasifier 17 and pyrolyzer 14, and combustion of these gases takes place in the combustion chamber of a boiler which produces steam used to generate electricity. The flue gases produced by the combustion chamber in the boiler are applied to a fine ash separator and the clean flue gases that exit the separator are applied to a stack.

Figure 2:
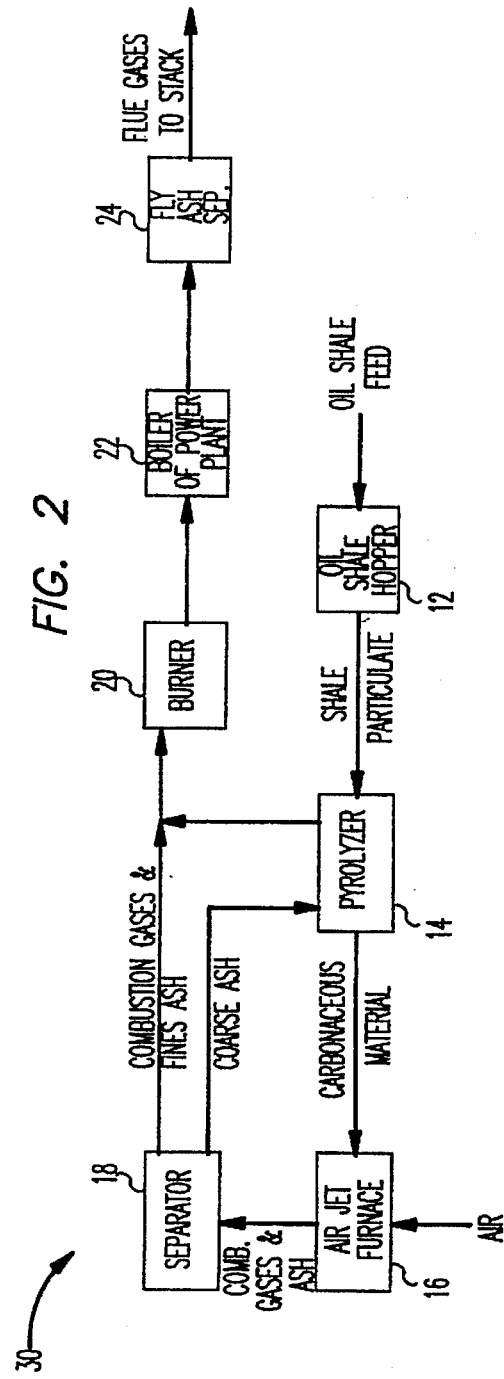
FIG. 2 is a block diagram of a modification of the apparatus shown in FIG. 1.

In the apparatus indicated by reference 30 in FIG. 2, the dryer and gasifier have been eliminated to simplify the construction and operation of the equipment.

In the embodiment of the present invention shown in FIG. 3 as apparatus 60, screw conveyor 62 transports hot carbonaceous material entering through entrance 64 positioned preferably above screw conveyor 62. The screw conveyor is driven by motor 66 shown in FIG. 4, and the axle of the screw conveyor is rotatably supported by bearings 68 and 70 present at ends 72 and 74 of screw conveyor 62 which are preferably water cooled. The conveying rate can be modified by varying the speed of the motor or by the use of gears preferably by up to ten times. Housing 76 of screw conveyor 62 is supported by supports 78 and 79.

Vaned rotor 80, mounted on the axle of screw conveyor 62, positioned preferably near end 74 of the screw conveyor, is provided with chute 82, shown in FIG. 4 preferably being substantially horizontal and preferably having expansion joint 84. Threads 63 of screw conveyor 62 adjacent rotor 80, present on the side of rotor 80 distant from entrance 64 and adjacent bearing 70 are reversed in thread in order to minimize the amount of carbonaceous material not exiting the screw conveyor housing via the rotor and thus accumulating in the end of housing 76 near bearing 70. Screw conveyor 62, vaned rotor 80 and housing 76 are preferably constructed from heat resistant material. The actual material selected depends on the fuel or material being conveyed and the operating conditions.

Figure 5:
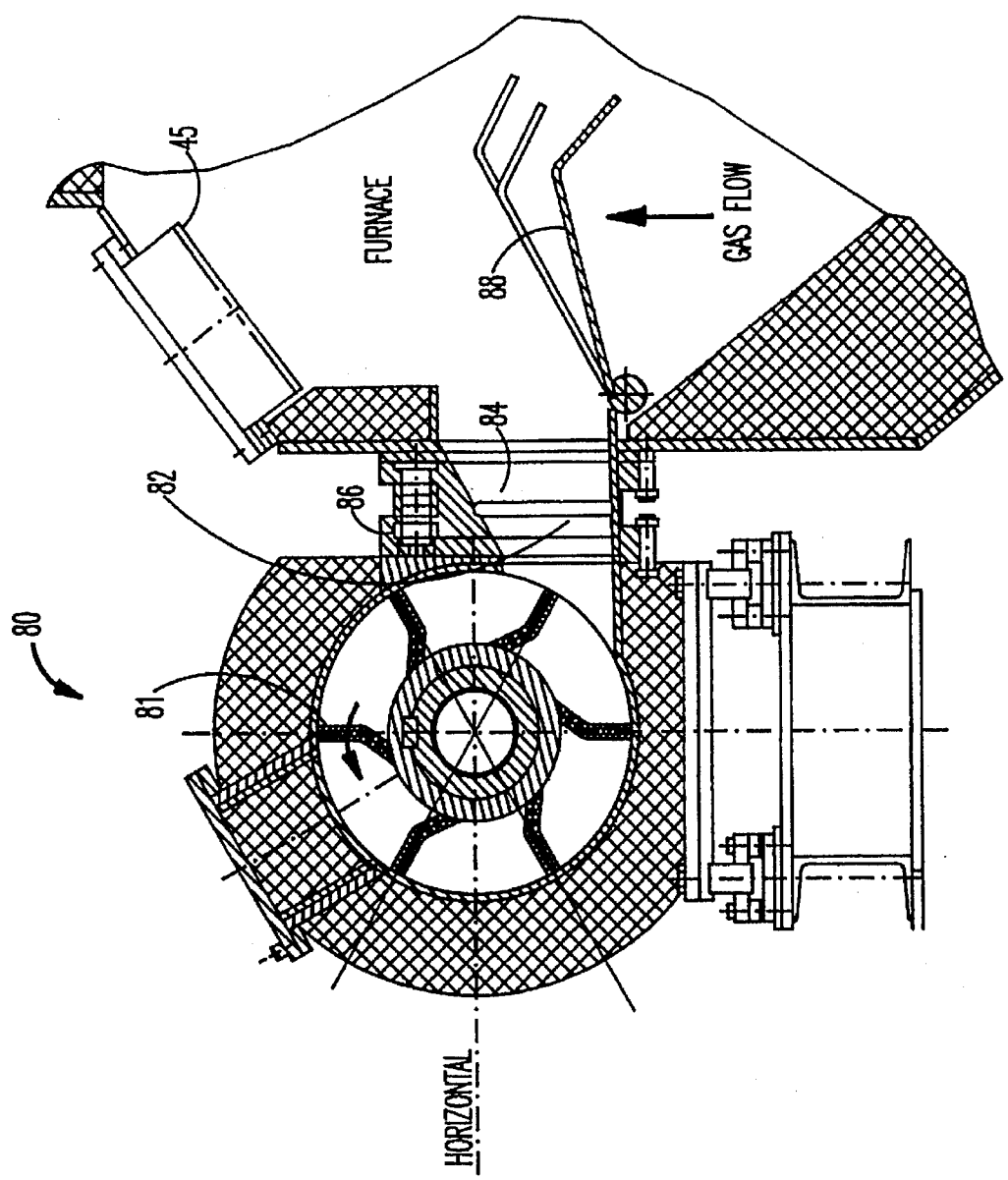
FIG. 5 is a cross-sectional diagram of the rotor used in the embodiment of the invention shown in FIG. 3.

Vanes 81 of rotor 80, shown in FIG. 5, to which reference is now made, are preferably shaped in such a manner for facilitating the transportation of the hot carbonaceous material from screw conveyor 62 towards chute 82. Advantageously, expansion joint 84 of chute 82, preferably provided with ball joint 86, gives flexibility to the joint needed when it is connected to another item. As shown in FIG. 5, chute 82 is connected to air jet furnace 45 for supplying the hot carbonaceous material to a location adjacent to the air jet furnace's entrance where gases flow vertically upward through its entrance. Vertically maneuverable, hinged and preferably length adjustable extension 88 is preferably provided. When operated in conjunction together with air jet furance 45, exit chute 82 is connected to furnace 45 such that extension 88 is present in furnace 45. Thus, by setting extension 88 at a certain angle to the horizontal and preferably at a certain length, extension 88 additionally aids in producing a plug of material for minimizing the gas flow into the chute and screw conveyor from the furnace. Its angle to the horizontal and its length can be adjusted depending on the conditions and material used to produce a plug of material suitable for minimizing the gas flow into the chute and screw conveyor from the furnace.

Figure 3A:
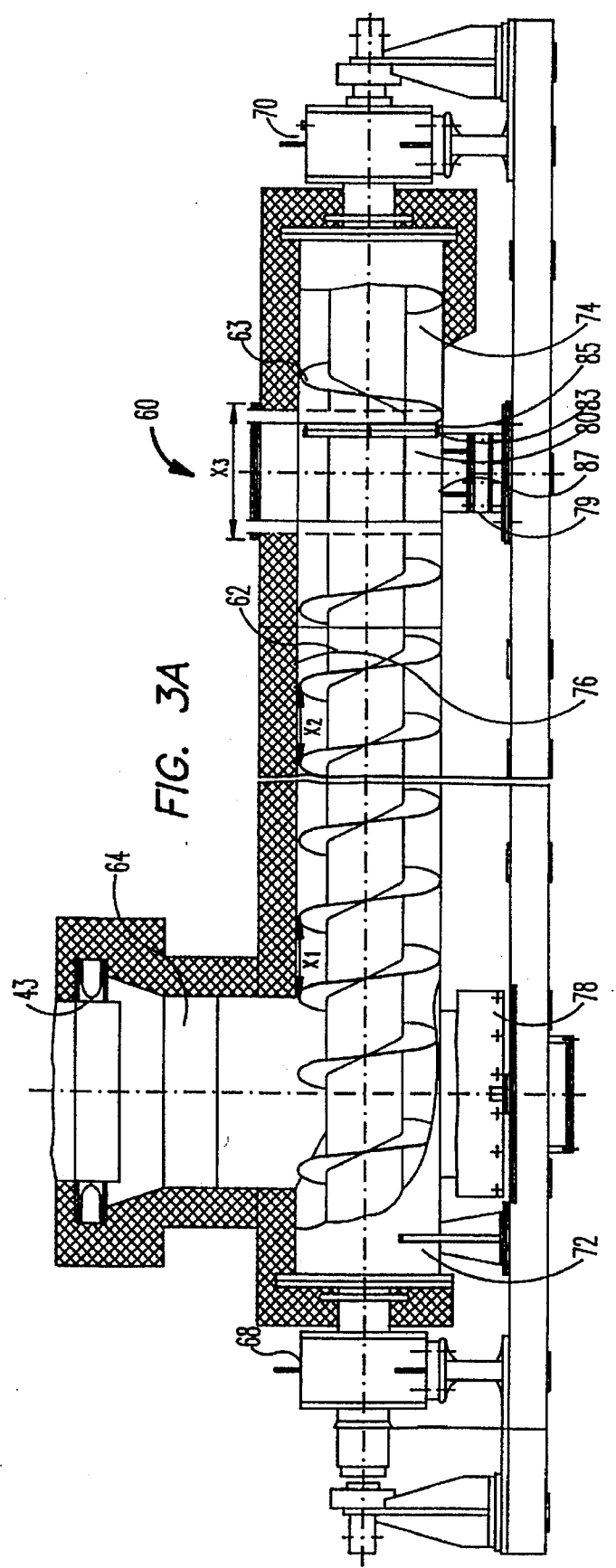
FIG. 3A is a cross-sectional diagram of a additional embodiment of the present invention using an alternative arrangement for the rotor.

In an additional embodiment of the present invention, an alternative arrangement as shown in FIG. 3A for rotor 80 is used. As can be seen, preferably round plate 83, preferably mounted on the screw conveyer together with an additional small vaned rotor 85 is provided in addition to main vaned rotor 87. The total width of main rotor 87, plate 83 and small rotor 85 is a little smaller than the width x3 of exit chute 82 in order to facilitate the extraction of the material being conveyed along the screw conveyor by rotor 80. By using such an arrangement, the amount of conveyed material which finds its way past rotor 80 and may accumulate on the side of rotor 80 distant from entrance 64 in the end of housing 76 near bearing 70 is even more minimized. Eg. the width of main rotor can be 200 mm compared with 40 mm for the width of small rotor 85. screw conveyor 62. In this respect, it is regarded at present preferable to fix rotor 80 to the axle of screw conveyor 62.

In addition, screw conveyer 62 is preferably horizontally orientated.

In operation, hot carbonaceous material, produced by pyrolyzer 43 (shown in FIG. 6) enters screw conveyor housing 76 through entrance 64 and is transported by screw conveyor 62 along its axis towards vaned rotor 80. The system and apparatus is preferably designed such that the carboneous material fills substantially all of the volume of housing 76 near the entrance of the conveyor, while its moves relatively freely along the rest of the length of screw conveyor 62 since the hot carbonaceous material does not fill the whole screw conveyor housing volume at this location, there always being some space left free from carbonaceous material in the upper portion of screw feed housing 76. This is achieved by controlling basically the thread pitch along the screw conveyor, which substantially determines the volume between the threads although the axle diameter also influences this volume to some extent. Preferably, the thread pitch in the middle portion of the conveyor x2 is larger, preferably up to 20% more, than the pitch x1 near the entrance. Hot carbonaceous material transported by screw conveyor 62 to vane rotor 80 is extracted by the rotor from housing 76 and supplied to furnace 45 via chute 82 which is slightly upwardly inclined from the horizontal. The dimensions of chute 82, ie. its general length, the length and height of its entrance, its angle of inclination and angle of opening are designed to produce a plug of material near its exit in order to minimize the flow of gases from furnace 45 into the chute and screw conveyor housing. Preferably, its general length should not too long. Furthermore, it is advantageous to position chute 82 at the lower portion of the rotor so that its entrance is opposite the portion of the rotor which contains and is substantially filled with the carbonaceous material. This also minimizes the possibility of hot gases present in furnace 45 from flowing into screw feed housing 76.

Furthermore, preferably provided, substantially vertically maneuverable, hinged extension 88 present in furnace 45 aids in forming the plug of material and minimizes the flow of gases present in the furnace into chute 82 and screw conveyor 62. Additionally, if preferred, a plate or plates (not shown) positioned on the upstream side of the rotor or on both sides of the rotor respectively adjacent the rotor and in the upper portion of the conveyor housing can be provided for further minimizing the possibility of gases present in the furnace to enter into and flow along the screw conveyor.

Figure 6:
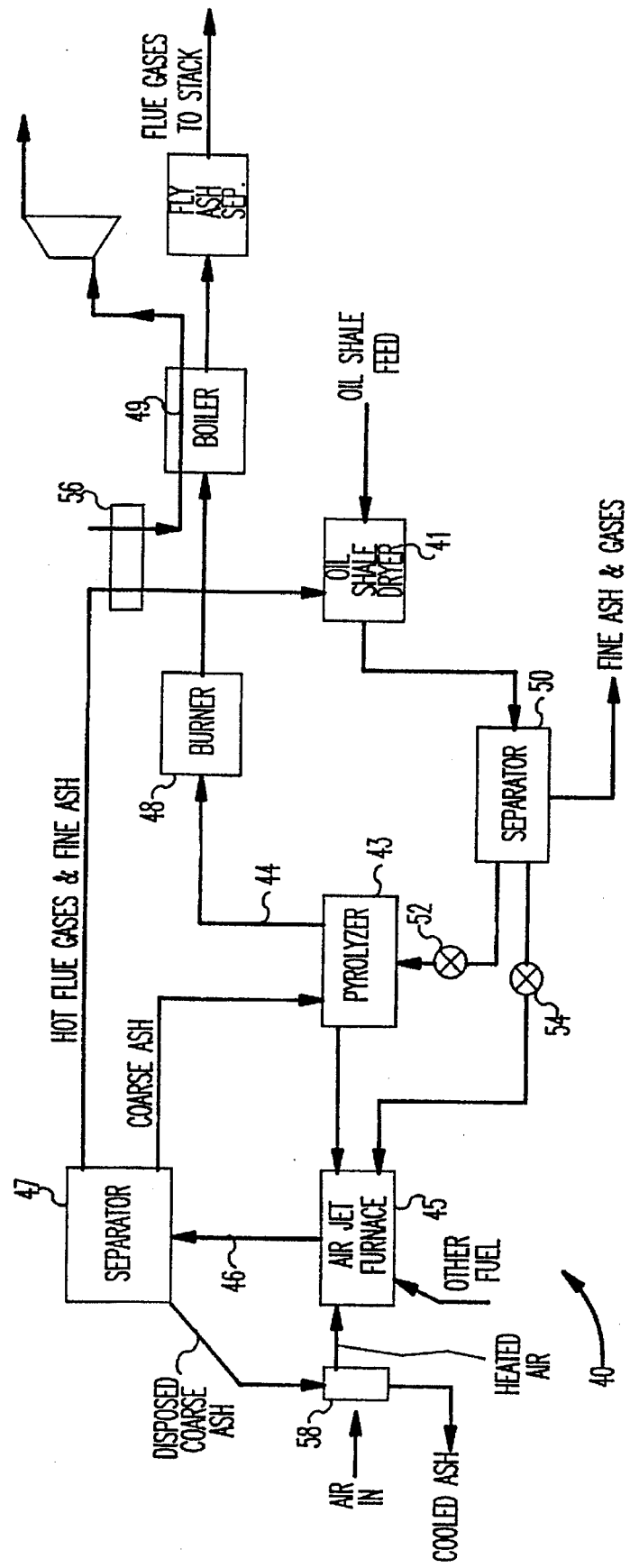
FIG. 6 is a schematic diagram of an embodiment of the present invention showing a system for producing combustible gases from low grade solid fuel such as oil shale.

Turning to the embodiment shown schematically in FIG. 6, considered at present to be the best mode of the present invention, apparatus 40 comprises burner 48 and boiler 49 suitable for the operation of a power plant which employs steam generated by boiler 49. In the apparatus shown in FIG. 6, oil shale is fed into dryer 42 usually from a hopper (not shown) using conveyor 41 wherein the shale is dried by reason of the application to the dryer of the hot flue gases containing hot fine ash. After these gases and hot ash give up their heat to the shale, water in the shale is vaporized and separated together with the cooled gases and cooled fine ash by separator 50 from the heated and dried shale.

Portion of the heated and dried shale from separator 50 is conveyed to pyrolyzer 43 by conveyor 51, where the fuel is heated substantially in the absense of oxygen to produce combustible gases which exit through conduit 44, and hot carbonaceous material which is supplied to air jet furnace 45 using conveyor 53, preferably a screw conveyor of the type described hereinbefore. In air jet furnace 45, the carbonaceous material and a further portion of the hot and dried shale, supplied to the furnace 45 via conveyor 54, is combusted with air. The products of combustion exit the furnace through conduit 46, such products comprising hot flue gases and ash particulates which are applied to separator 47. The latter separates the ash from the flue gases carrying fine ash and part of the separted ash is fed to pyrolyzer 43 while another part of which is disposed of or extracted in an ash removal system. Preferably, the ash disposed is cooled by heating air supplied to air jet furnace 45 in heat exchanger 58.

The combustible gases that exit the pyrolyzer through conduit 44 together with some entrained ash; and as a consequence, these gases burn in burner 48 in a substantially clean manner. Little ash build-up occurs in the combustion chamber and heat exchange surfaces of boiler 49. Because of this, the efficiency of the boiler is not adversely affected, and down time for cleaning fouled heat exchange surfaces is reduced.

Because the shale that enters pyrolyzer reactor 43 is already heated and dried in the dryer, less heat than is conventional has to be supplied by the ash from separator 47. Consequently, the furnace can be operated at a lower temperature which reduces carbon dioxide emission from the power plant utilizing the invention.

In this embodiment, heat exchanger 56 is employed for heating water vaporized in boiler 49 with heat contained in hot flue gases and fine ash exiting separator 47. As shown in the apparatus disclosed in FIG. 6, the steam produced in boiler 49 can be used to operate a power plant including a steam turbine. Although heat exchanger 56 extracts heat contained in the flue gases and ash exiting separator 47, sufficient heat is left in the flue gases and ash to carry out the drying of the oil shale in drier 42.

Even though heat exchanger 56 has hot flue gases and fine ash flowing though it, relatively little ash build up occurs on its heat exchange surfaces since heat transfer occurs in this heat exchanger in the absense of combustion. Furthermore, since the water temperature in this heat exchanger will usually be less than about 200° C., the temperature of the wall of the heat transfer surfaces will consequently be close to such a temperature and thus the probability of the occurance of fusing will be low.

In addition, if preferred conveyor 54 and/or conveyor 41 can be a screw conveyor of the type herein described and with reference to FIGS. 3, 3A, 4 and 5.

By supplying oil shale to the pyrolyzer as well as to the furnace, flexibility of operation is achieved such that a wide selection of oil shales having differing calorific values can be used. This is achieved by using conveyors 52 and 54 to change the respective conveying rates of the oil shales to the pyrolyzer as well as to the furnace. Thus, sufficient heat can be produced in the furnace even when for example oil shales having low calorific values are used. According to the present invention, usually a greater portion of the oil shales will be supplied to furnace and less of the oil shales will be supplied to the pyrolyzer when an oil shale having a low calorific value is used (ie. having a relatively small quantity of organic matter). On the other hand, a smaller portion of the oil shale will be supplied to furnace and more of the oil shale will be supplied to the pyrolyzer when a oil shale having a high calorific value is used. Thus, according to the present invention, combustible gases are produced for a broad range of oil shales.

Even though the furnace can be operated at a lower temperature if preferred, as explained hereinbefore, the furnace temperature can be adjusted so that sufficient carbonate will be decomposed to produce CaO which normally with the remaining carbonate will ensure the capture of sulfur during pyrolysis and/or during combustion in the furnace. Such capture is also efficient in the combustion chamber of boiler 49 due to the temperature therein and is optimal for such reactions eg. $CaO + \frac{1}{2}O_2 + SO_2 \rightarrow CaSO_4$ and/or $CaCO_3 + \frac{1}{2}O_2 + SO_2 \rightarrow CaSO_4 + CO_2$, to take place. Furthermore, if preferred, the particulate reaching the combustion chamber from pyrolyzer 43 can be used for facilitating the absorption of sulfur coming from oxides of sulfur and/or other sulfur compounds originating from the combustion of other fuels in the combustion chamber which are rich in sulfur.

While the invention is described in connection with utilizing low grade fuel such as oil shale, the invention is applicable to other types of low grade fuel such as peat, refuse derived fuel (RDF) as well as unsegregated refuse such as municipal solid waste or other combustible material usually having low calorific value.

Furthermore, while this specification refers to oil shale or other low grade solid fuel as material for use in the pyrolyzer, it should be understood that the oil shale or other low grade fuel may be mixed with or introduced into the pyrolyzer together with another fuel or petroleum product or other combustible material, such as residual oil and asphalt, rich in sulfur. In such case, particulate from the pyrolyzer can be used to efficiently capture of sulfur coming from oxides of sulfur and/or other compounds during pyrolysis and/or combustion in the furnace and/or during combustion of the pyrolysis gases. The other materials rich in sulfur previously mentioned may be a solid, liquid, or gaseous.

Moreover, as shown in FIG. 6, high sulfur content fuels can be added to the furnace or air jet furnace in order to facilitate the capture of sulfur during combustion in the furnace or air jet furnace by carbonate contained in the carbonaceous material supplied from said pyrolyzer and/or CaO produced by the decomposition of the carbonate. Alternatively, these fuels can be added at the upper portion of the furnace or air jet furnace or at any other preferred site in the system. If preferred, ash exiting the furnace can be applied to the combustion chamber for capturing sulfur contained in compounds during combustion of the combustible gases and/or other material rich in sulfur that takes place in the combustion chamber rather than or in addition to ash and hot flue gases exiting the separator used for drying the oil shale.

In addition, a portion oil shale or other low grade fuel may be mixed with or introduced into the pyrolyzer together with a portion of another fuel or petroleum product or other combustible material, such as residual oil and asphalt, rich in sulfur with the other portion of these materials being introduced into the air jet furnace or furnace.

In this connection, other apparatus for producing combustible gases from solid fuel such as low grade solid fuel can be used for combusting the combustible gases together with another fuel or petroleum product or other combustible material, such as residual oil and asphalt, rich in sulfur. In such case, particulate from the pyrolyzer, if used in such apparatus, can be used to efficiently capture sulfur from oxides of sulfur and/or other compounds during pyrolysis and/or combustion in the furnace, if used, and/or during combustion of the pyrolysis gases if preferred. The other materials rich in sulfur previously mentioned may be a solid, liquid, or gaseous.

In addition, while FIG. 6 shows the present invention used for producing combustible gases that are used in a utilization device, which may be the combustion chamber of a power plant, the combustible gases from such apparatus or other apparatus for producing combustible gases from solid fuel or other combustible material can be used for this or other purposes. These may include burning the gases in the combustion chamber of a gas turbine, or internal combustion engine such as a diesel engine that may drive a generator and produce power, or utilizing the gases as raw material in a chemical production line or other suitable uses. Furthermore, these gases may be used as the fuel in cement plants. Also, the ash extracted or disposed from the apparatus shown in FIG. 6 or other apparatus of the type mentioned above can be used as an additive to cement. Additionally, heat from a cement plant can be used in apparatus mentioned above for eg. preheating air before it enters the furnace, providing heat for pyrolysis, for drying the oil shale and/or preheating air before it enters the combustion chamber of a power plant or other device.

The present invention also comprises a method of and means for improving raw phosphates (i.e., phosphates found in many places in the world containing more than about 1–5% by weight of organic material) by eliminating substantially all organic material. According to the invention, apparatus disclosed in the present application, or apparatus disclosed in U.S. Pat. No. 4,211,606 can be used. Alternatively, apparatus disclosed in U.S. Pat. No . 4,700,639, the disclosure of which is hereby incorporated by reference, can be used. At present, the best mode of the present invention for improving raw phosphates, is apparatus disclosed in the present application, wherein a pyrolyzer converts organic matter contained in the phosphates into gas.

Conventional methods of raw phosphate improvement can handle phosphates containing up to only 1 to 5% by weight of organic matter. Improved results can be obtained by baking the phosphates at a temperature of approximately 900° C. so that most of organic matter is consumed. Such baking, however, will not be sufficient to deal with phosphates having a higher organic matter content.

Figure 7:
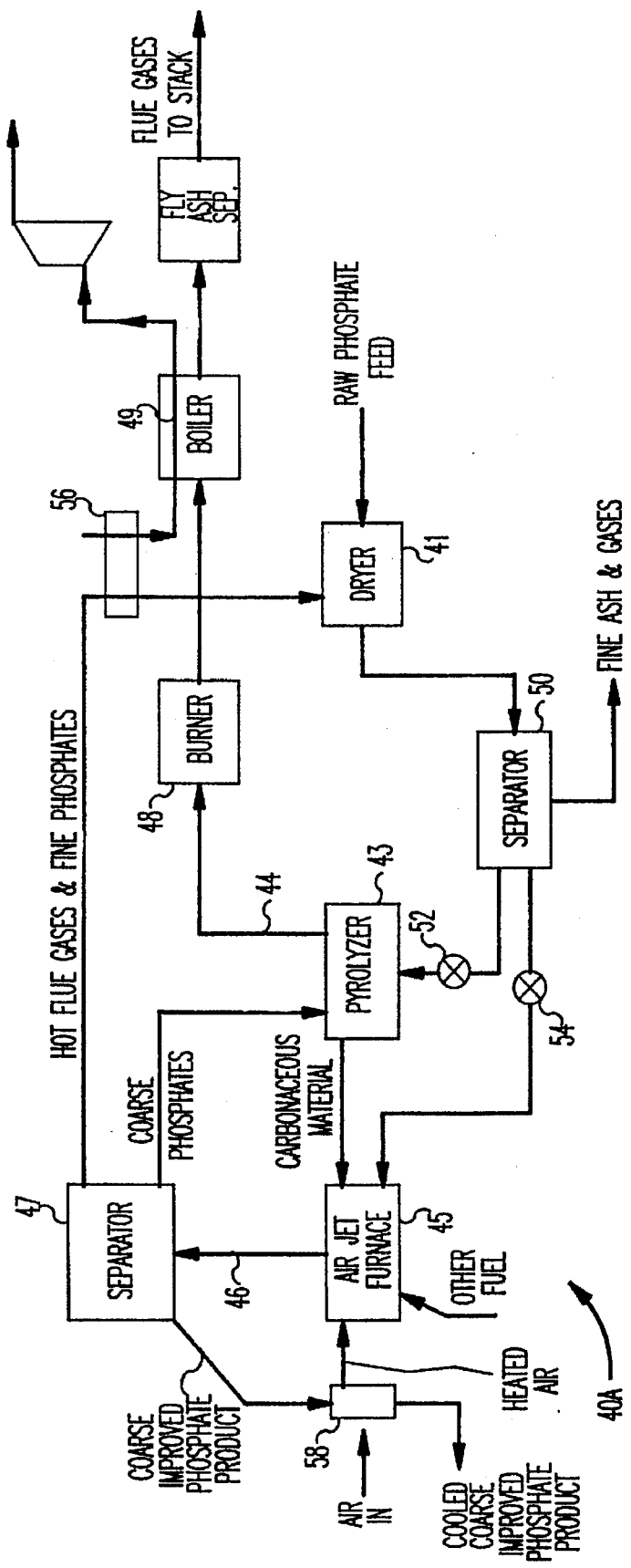
FIG. 7 is a block diagram of another embodiment of the present invention showing a system for producing improved phoshates by removing organic matter in the phosphates.

The preferred method for improving raw phosphates having organic content higher than 1.5%, according to the present invention, is to utilize at least a two-stage process of (1) pyrolysis and (2) baking. According to the present invention, pyrolysis is first carried out on portion of the raw phosphates for converting organic matter contained in the phosphates into combustible gases which are extracted from the pyrolyzer and made available for combustion as shown in the apparatus disclosed in FIG. 7 while a further portion of raw phosphates is supplied to air jet furnace 45. Alternatively, the combustible gases can be furnished to a utilization device other than the combustion chamber of a power plant. In pyrolyzer 43, the phosphates are heated substantially in the absense of oxygen to produce combustible gases which exit through conduit 44, and carbonaceous material which is supplied to air jet furnace 45 where the carbonaceous material and the raw phosphates supplied to the furnace 45 via conduit 42 are combusted with air. The products of combustion exit the furnace through conduit 46, such products comprising hot flue gases and improved phosphates which are applied to separator 47. The latter separates the phosphates into a stream which is fed to pyrolyzer 43, a further stream of phosphates which is extracted as the improved phosphate product while an additional stream contains hot flue gases and fine phosphates. Preferably, the improved phosphate product is cooled by heating air entering air furnace 45 in heat exchanger 58. As shown in FIG. 7, the hot flue gases and fine phosphates can be used for drying the phosphates before they are supplied to the pyrolyzer and air jet furnace.

Also in this embodiment, flexibility of operation is achieved such that a wide selection of phosphates having differing calorific values can be used by supplying the phosphates to the furnace as well as to the pyrolyzer. This is achieved by using conveyors 52 and 54 to change the respective conveying rate of phosphates to the pyrolyzer as well as to the furnace. Thus, sufficient heat can be produced in the furnace even when for example phosphates having low calorific values are used. According to the present invention, usually a greater portion of the phosphates will be supplied to furnace and less of the phosphates will be supplied to the pyrolyzer when a phosphate having a low calorific value is used (ie. having a relatively small quantity of organic matter). On the other hand, a smaller portion of the phosphates will be supplied to furnace and more of the phosphates will be supplied to the pyrolyzer when a phosphate having a high calorific value is used. Thus, according to the present invention, combustible gases are produced for a broad range of phosphates.

Phosphates remaining in the pyrolyzer after pyrolyzing is effected are removed and baked in an air jet furnace which, preferably, is operated at a relatively high speed and a relatively high temperature, about 900° C., such that any organic material remaining in the phosphates is combusted, and/or any other processes requiring such a high temperature in the improvement process of the raw phosphates may take place. Consequently, the phosphates exiting the air jet furnace will contain only a relatively small amount of organic matter and are thus improved.

Thus, a portion of the improved phosphates exiting the air furnace is extracted as the product of the process, while a further portion is applied to the pyrolyzer for heating phosphates therein during the pyrolysis process. In other words, a portion of the particulate improved phosphates exiting the air furnace is supplied to the pyrolyzer in a manner similar to that in which the ash exiting the air furnace is supplied to the pyrolyzer in the previous embodiment of the present invention, or in the manner in which the apparatus disclosed in U.S. Pat. No. 4,211,606 provides heat for the pyrolysis process.

Additionally, while FIG. 7 shows the present invention used for producing improved phosphates and combustible gases that are used in a utilization device, which may be the combustion chamber of a power plant, the combustible gases from such apparatus or other apparatus for producing combustible gases from solid fuel or other combustible material can be used for this or other purposes. These may include burning the gases in the combustion chamber of a gas turbine, or internal combustion engine such as a diesel engine that may drive a generator and produce power, or utilizing the gases as raw material in a chemical production line or other suitable uses. Furthermore, these gases may be used as the fuel in cement plants. Also, the ash extracted or disposed from the apparatus shown in FIG. 7 or other apparatus of the type mentioned above other similar apparatus can be used as an additive to cement. Additionally, heat from a cement plant can be used in apparatus mentioned above for eg. preheating air before it enters the furnace, providing heat for pyrolysis of the phosphates, for drying the phosphates and/or preheating air before it enters the combustion chamber of a power plant or other device.

If the amount of organic matter in the phosphates reaching the air jet furnace from the pyrolyzer is insufficient for permitting the air jet furnace to operate at the high temperature required, coal or any other fuel or combustible material can be added to the air jet furnace to ensure that the required high temperatures are achieved in the air furnace as shown in FIG. 7. Alternatively, a portion of the gases exiting the pyrolyzer can be added to the air jet furnace for ensuring that the required high temperatures are reached.

Furthermore, in the case of oil shale or other low grade fuels, coal or any other fuel including high grade fuels such as liquid fuel eg. kerosine, residual oil etc. can be added to the furnace or air jet furnace as schematically shown in FIG. 6 for maintaining the required temperature in the furnace and also to facilitate the operation and control of the system on a whole and particularly enabling different low grade fuels having different calorific value to be used in the apparatus. Such fuels and methods can also be used in conjunction with phosphates as shown in FIG. 7. High sulfur content fuels can be used for such a purpose as CaO contained in the carbonaceous material supplied from said pyrolyzer and/or CaO produced by the decomposition of the carbonate will capture sulfur coming from such fuels in the furnace. Moreover, also in conjunction with phosphates as shown in FIG. 7, another fuel or petroleum product or other combustible material, such as residual oil and asphalt, rich in sulfur can be added to the furnace or air jet furnace in order also to facilitate the capture of sulfur coming from sulfur compounds during combustion in the furnace or air jet furnace by carbonate contained in the carbonaceous material supplied from said pyrolyzer and/or CaO produced by the decomposition of the carbonate. Alternatively, these fuels or materials can be added at the upper portion of the furnace or air jet furnace or at any other preferred site in the system.

For starting up the systems or apparatus in the case of oil shale or other low grade fuels as well as in the case of phosphates, other fuel including high grade fuels such as gaseous or liquid fuel eg. kerosine, residual oil, or etc. all having low sulfur content can be added to the furnace or air jet furnace as schematically shown in FIGS. 6 and 7.

In addition, the phosphates may be mixed with or introduced into the pyrolyzer together with another fuel or petroleum product or other combustible material, such as residual oil and asphalt, rich in sulfur. In such case, particulate from the pyrolyzer can be used to efficiently capture sulfur coming from oxides of sulfur and/or other compounds during pyrolysis and/or combustion in the furnace and/or during combustion of the pyrolysis gases. The other materials rich in sulfur previously mentioned may be a solid, liquid, or gaseous.

In this connection, other apparatus for producing improved phosphates can be used for combusting the combustible gases together with another fuel or petroleum product or other combustible material, such as residual oil and asphalt, rich in sulfur. In such case, particulate from the pyrolyzer, if used in such apparatus, can be used to efficiently capture oxides of sulfur and/or other compounds during pyrolysis and/or combustion in the furnace, if used, and/or during combustion of the pyrolysis gases. The other materials rich in sulfur previously mentioned may be a solid, liquid, or gaseous.

Furthermore, a mixture of phosphates and oil shale can be processed in the same apparatus so that the capture of sulfur coming from sulfur compounds is further facilitated particularly when other materials rich in sulfur are combusted together with gases produced from the mixture of phosphates and oil shale. In such case, high sulfur content fuels or petroleum product or other combustible material, such as residual oil and asphalt, rich in sulfur can be added to the furnace or air jet furnace in order to facilitate the capture of sulfur coming from sulfur compounds during combustion in the furnace or air jet furnace by carbonate contained in the carbonaceous material supplied from said pyrolyzer and/or CaO produced by the decomposition of the carbonate. Thus, these fuels or materials can also be used for maintaining the required temperature if preferred. Alternatively, these fuels or materials can be added at the upper portion of the furnace or air jet furnace or at any other preferred site in the system.

In addition, the phosphates/oil shale mixture may be mixed with or introduced into the pyrolyzer together with another fuel or petroleum product or other combustible material, such as residual oil and asphalt, rich in sulfur. In such case, particulate from the pyrolyzer can be used to efficiently capture oxides of sulfur and/or other compounds during pyrolysis and/or combustion in the furnace and/or during combustion of the pyrolysis gases. The other materials rich in sulfur previously mentioned may be a solid, liquid, or gaseous.

In this connection, other apparatus for producing improved phosphates mixed together with oil shale can be used for combusting the combustible gases together with another fuel or petroleum product or other combustible material, such as residual oil and asphalt, rich in sulfur. In such case, particulate from the pyrolyzer, if used in such apparatus, can be used to efficiently capture sulfur coming from oxides of sulfur and/or other compounds during pyrolysis and/or combustion in the furnace, if used, and/or during combustion of the pyrolysis gases. The other materials rich in sulfur previously mentioned may be a solid, liquid, or gaseous. When a mixture of phosphates and oil shale is used, it is preferable to use only sufficient oil shale to facilitate the capture of sulfur but not reduce the quality of the phosphates.

Figure 8:
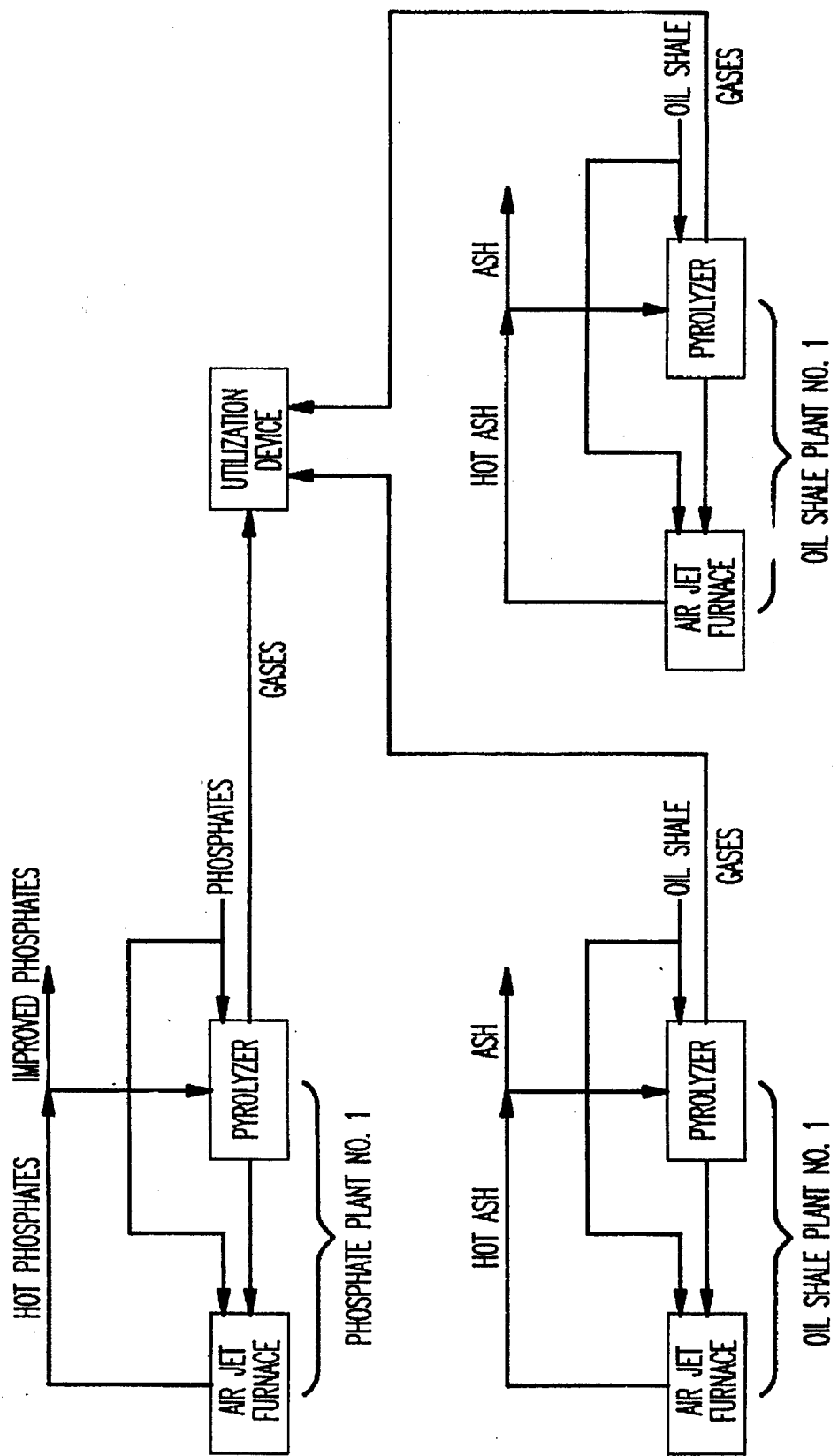
FIG. 8 is a block diagram of an embodiment of the present invention.

In a further embodiment of the present invention, a plurality of plants can be used for providing gases for a utilization device such as the combustion chamber of a power plant, or for other uses described above. In addition, one or a number of oil shale processing plants, such as the ones specified in the above described embodiment of the present invention or that described in U.S. Pat. No. 4,211,606 or in U.S. Pat. No. 4,700,639 or another suitable oil shale processing plants can be used in conjunction with one or a number of raw phosphate processing plants described above or other raw phosphate processing plants as shown schematically in FIG. 8. In such a manner, raw phosphates, usually having a varying calorific value, can be processed such that combustible gases exiting the raw phosphate processing plants, can be supplied to a combustion chamber for combustion to which gases exiting oil shale processing plants, usually having a reasonable fixed calorific value, are also supplied. If preferred, however the gases produced by the raw phosphates processing plants and the oil shale processing plants can be supplied to separate combustion chambers.

Alternatively, if some of the raw phosphates have a reasonable fixed calorific value, these phosphates can also be processed in a separate plant or plants, with the phosphates having a varying calorific value being processed in other processing plants. Gases produced from these processing plants can be supplied to a common combustion chamber, or to separate combustion chambers if preferred.

Furthermore, where the raw phosphates and oil shale are extracted from the same or adjacent layers (shale layers are often above or below phosphate layers), a single conveyer may be used for conveying the oil shale and/or phosphates to the appropriate processing plants. In such a way, separate conveyer systems are eliminated.

Figure 9A:
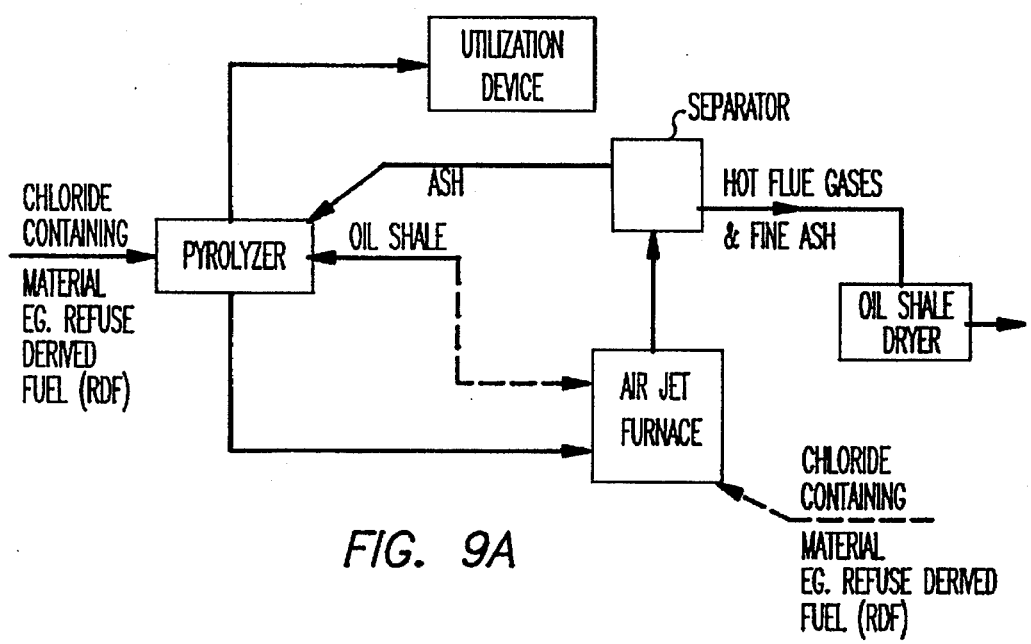
FIG. 9A is a schematic diagram of another embodiment of the present invention
Figure 9B:
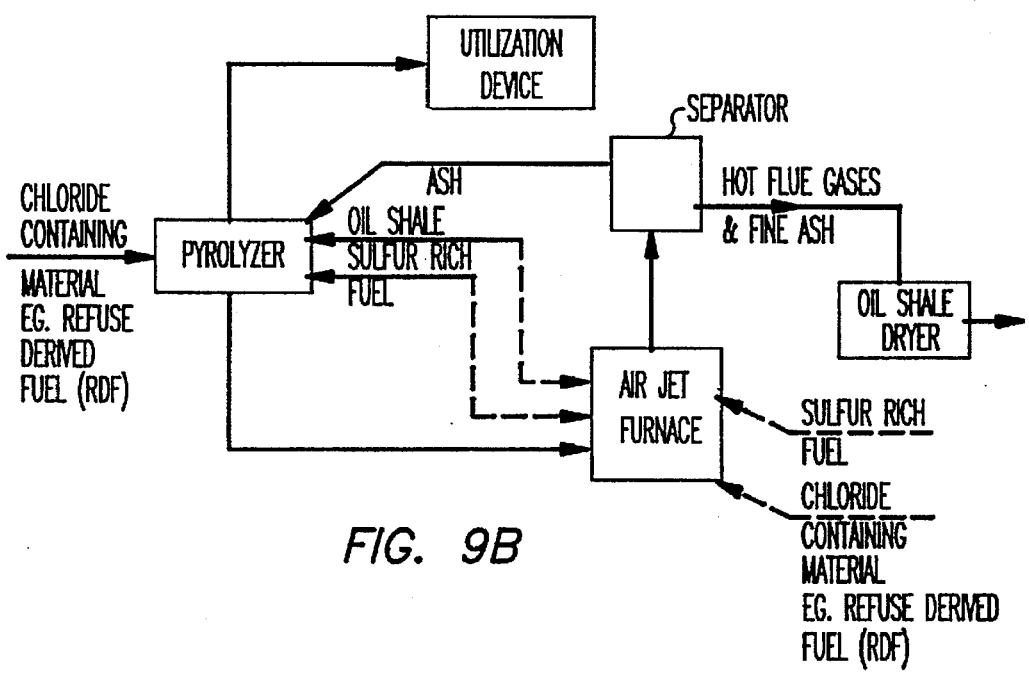
FIG. 9B is a schematic diagram of another embodiment of the present invention

In a still further embodiment of the present invention, oil shale can be pyrolyzed together with refuse derived fuels or other fuels or materials containing chlorides and maybe dioxines in preparation for combusting the gases produced therefrom in a manner described above eg. in the combustion chamber of a boiler of steam turbine power plant or in the steam turbine of a combined cycle power plant. FIG. 9A schematically shows such an arrangement. In such a manner, chlorides and dioxines if present contained in the material or fuel will be absorbed by CaO and calcium carbonates coming from the oil shale during pyrolysis as well as during combustion. In addition, the oil shale can be pyrolyzed together with sulfur-rich fuels such as residue oil, high sulfur coal, etc. and refuse derived fuels or other fuels or materials containing chlorides for combusting the gases produced therefrom in a manner described above. Such an arrangement is schematically shown in FIG. 9B. In such a case, the CaO and calcium carbonates coming from the oil shale and still present after having absorbed sulfur, sulfur dioxide and hydrogen sulfide, etc. can be used to absorb the chlorides and dioxines if present during pyrolysis as well as during combustion. If preferred, mixtures of oil and sulfur-rich fuels can be used.

In addition, if preferred, rather than supplying the sulfur-rich fuel to the pyrolyzer, this fuel may be furnished to the air jet furnace or furnace where carbonaceous material remaining after the oil shale has been pyrolyzed is combusted. Alternatively, the refuse derived fuels or other fuels or materials containing chlorides and maybe dioxines may be added to the air jet furnace or furnace where carbonaceous material remaining after the oil shale has been pyrolyzed is combusted rather than supplying the material to the pyrolyzer.

Moreover, while it is described that the refuse derived fuels or other fuels or materials containing chlorides and maybe dioxines can be supplied to the pyrolyzer or furnace, a portion of this material may be supplied to the pyrolyzer with the other portion being supplied to the furnace. This is similar to the manner in which one portion of the oil shale or low grade fuel or a portion of a mixture or oil shale and sulfur-rich fuel or a portion of oil shale and a portion of sulfur-rich fuel is furnished to the pyrolyzer and the other portion of these materials is furnished to the furnace described above in particular to FIG. 6.

Figure 9C:
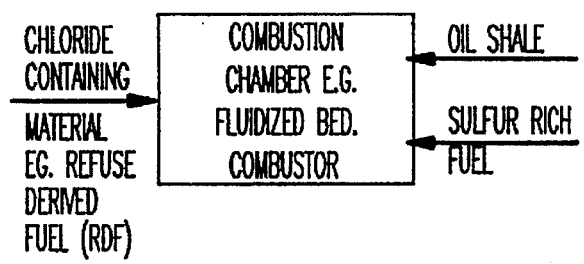
FIG. 9C is a schematic diagram of another embodiment of the present invention.

Furthermore, oil shale can be combusted with together with sulfur-rich fuels such as residue oil, high sulfur coal, etc. together with refuse derived fuels or other fuels or materials containing chlorides and maybe dioxines in eg. fluidized bed combustors. FIG. 9C schematically shows such an arrangement. Also here, the CaO and calcium carbonates coming from the oil shale and still present after having absorbed sulfur, sulfur dioxide and hydrogen sulfide, etc. can be used to absorb the chlorides and dioxines if present during during combustion. Thus the oil shale is used in specific quantities to provide sufficient CaO and calcium carbonate for absorbing sulfur, sulfur dioxide and hydrogen sulfide etc. as well as the chlorides and dioxines. If preferred, mixtures of oil and sulfur-rich fuels can be also be used here.

In addition, it should be pointed out that substantially the use of sulfur-rich fuels in the present invention is mainly for permitting the economical combustion of the oil shale due to the relatively high calorific value of the sulfur-rich fuels. As a side-benefit, the oil shale provides for the absorption of sulfur and its compounds as well as other potentially noxious materials such as chlorides and dioxines if present.

The advantages and improved results furnished by the method and apparatus of the present invention are apparent from the foregoing description of the preferred embodiment of the invention. Various changes and modifications may be made without departing from the spirit and scope of the invention as described in the appended claims.

What is claimed is:

1. A method for supplying solid material containing gases having a relatively low pressure to a location containing gases at a relatively higher pressure comprising the step of providing a screw conveyor for receiving said solid material and transporting said material along the length of the conveyor to a rotor having a main rotor, round plate and additional small rotor positioned on the axle of the screw conveyor near the end of said screw conveyor for receiving transported solid material and supplying the material to said location.

2. A method according to claim 1 further comprising the step of providing said rotor with an exit chute for transporting said solid material from the rotor to said location and producing a plug of material at the exit chute.

3. A method according to claim 1 wherein said chute is provided with an expansion joint.

4. A method according to claim 3 wherein said expansion joint comprises a ball joint.

5. A method according to claim 1 further comprising the step of providing two bearings, one at each end of the screw conveyor, for providing support to said conveyor.

6. A method according to claim 2 further comprising the steps of providing said chute with a hinged extension and connecting said chute to said location such that said hinged extension is present in said location, said extension also contributing to the formation of a plug of material at the exit chute for minimizing the flow of gases present in said location into said chute and said screw conveyor.

7. Apparatus for supplying solid carbonaceous material from a pyrolyzer to a furnace comprising a screw conveyor for receiving said solid carbonaceous material from said pyrolyzer and transporting it along its length to a rotor having a main rotor, round plate and additional small rotor positioned on the axle of the screw conveyor substantially near the end of said screw conveyor for supplying said carbonaceous material to said furnace.

8. Apparatus according to claim 7 further comprising an exit chute positioned substantially near said rotor for transporting said solid carbonaceous material from the rotor to the furnace.

9. Apparatus according to claim 8 wherein said chute is provided with an expansion joint.

10. Apparatus according to claim 9 wherein said expansion joint comprises a ball joint.

11. Apparatus according to claim 7 further comprising two bearings, one at each end of the screw conveyor, for supporting said conveyor.

12. Apparatus according to claim 8 further comprising a hinged extension hinged to said chute wherein said chute is connected to said furnace such that said hinged extension is present in the furnace and also contributes to the formation of a plug of material at the exit chute for minimizing the flow of gases present in said furnace into said chute and said screw conveyor.

13. A method for producing combustible gases from solid fuel comprising the steps of:
  a) pyrolyzing a portion of said fuel in a reactor to produce said combustible gases and carbonaceous material;
  b) supplying said carbonaceous material from said reactor to a furnace using a screw conveyor for receiving said carbonaceous material from said reactor and transporting said carbonaceous material along the length of the conveyor to a rotor having a main rotor, a round plate, and additional small rotor positioned on the axle of the screw conveyor substantially near the end thereof for supplying said carbonaceous material to said furnace;
  c) adding to said furnace a further portion of said solid fuel for combusting the carbonaceous material and said further portion of solid fuel to produce combustion products that include hot flue gases and ash particulate;
  d) separating said combustion products into a plurality of streams, one of which contains ash, another of which contains ash for extraction and a further one of which contains flue gases and fine ash; and
  e) directing said ash from said first stream into the reactor.

14. A method according to claim 13 further comprising the step of using said combustible gases in the production of electricity.

15. A method according to claim 13 further comprising the step of using heat from a cement plant in the production of electricity.

16. A method according to claim 13 further comprising the step of using heat from a cement plant for producing said combustible gases.

17. A method according to claim 13 further comprising the step of using said ash for extraction as an additive to cement.

18. A method according to claim 13 further comprising the step of using said combustible gases in a cement plant.

19. Apparatus for carrying out the method of claim 13 comprising:
  a) a reactor for pyrolyzing a portion of solid fuel to produce combustible gases and carbonaceous material;
  b) a screw conveyor for receiving said carbonaceous material from said reactor and transporting it along its length to a rotor having a main rotor, round plate and additional small rotor positioned on the axle of the screw conveyor substantially near the end of said screw conveyor for supplying said carbonaceous material to a furnace;
  c) means for adding to said furnace a further portion of said solid fuel for combusting the carbonaceous material and said further portion of solid fuel to produce combustion products that include hot flue gases and ash particulate;
  d) a separator for separating said combustion products into a plurality of streams, one of which contains ash and the another of which contains flue gases and fine ash;
  e) supply means for directing said ash from said first stream into the reactor.

20. A method for improving raw phosphates containing organic matter comprising the steps of:
  a) pyrolyzing a portion of the phosphates in a reactor for producing combustible gases and carbonaceous material;
  b) supplying said carbonaceous material from said reactor to a furnace using a screw conveyor for receiving said carbonaceous material from said reactor and transporting said carbonaceous material along the length of the conveyor to a rotor having a main rotor, a round plate, and an additional small rotor positioned on the axle of the screw conveyor near the end thereof for supplying said carbonaceous material to said furnace;
  c) adding to said furnace a further portion of said phosphates for combusting the carbonaceous material and said further portion of said phosphates to produce combustion products that include hot flue gases and improved phosphates;
  d) separating said combustion products into a plurality of streams, one of which contains phosphates, and the other of which contains improved phosphate products which are extracted; and
  e) directing said phosphates from said stream into the reactor.

21. Apparatus for carrying out the method of claim 20 comprising:
  a) a reactor for pyrolyzing a portion of phosphates to produce combustible gases and carbonaceous material;
  b) a screw conveyor for receiving said carbonaceous material from said reactor and transporting it along its length to a rotor having a main rotor, round plate and additional small rotor positioned on the axle of the screw conveyor substantially near the end of said screw conveyor for supplying said carbonaceous material to a furnace;
  c) means for adding to said furnace a further portion of said phosphates for combusting the carbonaceous material and said further portion of the phosphates to produce combustion products that include hot flue gases and improved phosphates;
  d) a separator for separating said combustion products into a plurality of streams, one of which contains phosphates, the another of which contains improved phosphate products which are extracted;
  e) directing said phosphates from said stream into the reactor.

22. A method for producing combustible gases from fuel, said method comprising the steps of:
  a) pyrolyzing a combination of oil shale containing calcium compounds and another fuel containing sulfur or chloride compounds in a reactor for producing combustible gases and carbonaceous material;
  b) combusting said carbonaceous material from said reactor in a furnace for producing combustion products that include hot flue gases and ash particulate; and
  c) directing ash particulate from said furnace into the reactor to sustain pyrolysis therein.

23. A method according to claim 22 wherein the quantity of oil shale supplied to the reactor is sufficient for the calcium compounds therein to effect the absorption of the sulfur or chloride compounds.

24. A method according to claim 22 wherein the temperature of pyrolyzation in the reactor is lower than the temperature of in the furnace.

25. A method according to claim 24 wherein absorption of sulfur or chloride compounds takes place in the reactor.

26. A method according to claim 22 wherein oil shale is combusted in said furnace with said carbonaceous material.

27. A method according to claim 26 wherein said another fuel is combusted in said furnace with said carbonaceous material.

28. Apparatus for producing combustible gases from fuel, said apparatus comprising:
  a) a reactor for pyrolyzing a combination of oil shale containing calcium compounds and another fuel containing sulfur or chloride compounds and producing combustible gases and carbonaceous material;
  b) a furnace for combusting said carbonaceous material from said reactor and producing combustion products that include hot flue gases and ash particulate; and
  c) means directing ash particulate from said furnace into the reactor for sustaining pyrolysis therein.

* * * * *